Nov. 18, 1969   M. A. DAVIDOW ET AL   3,478,749
GRAIN SEPARATING MECHANISM FOR THRESHING MACHINES
Filed Dec. 28, 1966   2 Sheets-Sheet 1
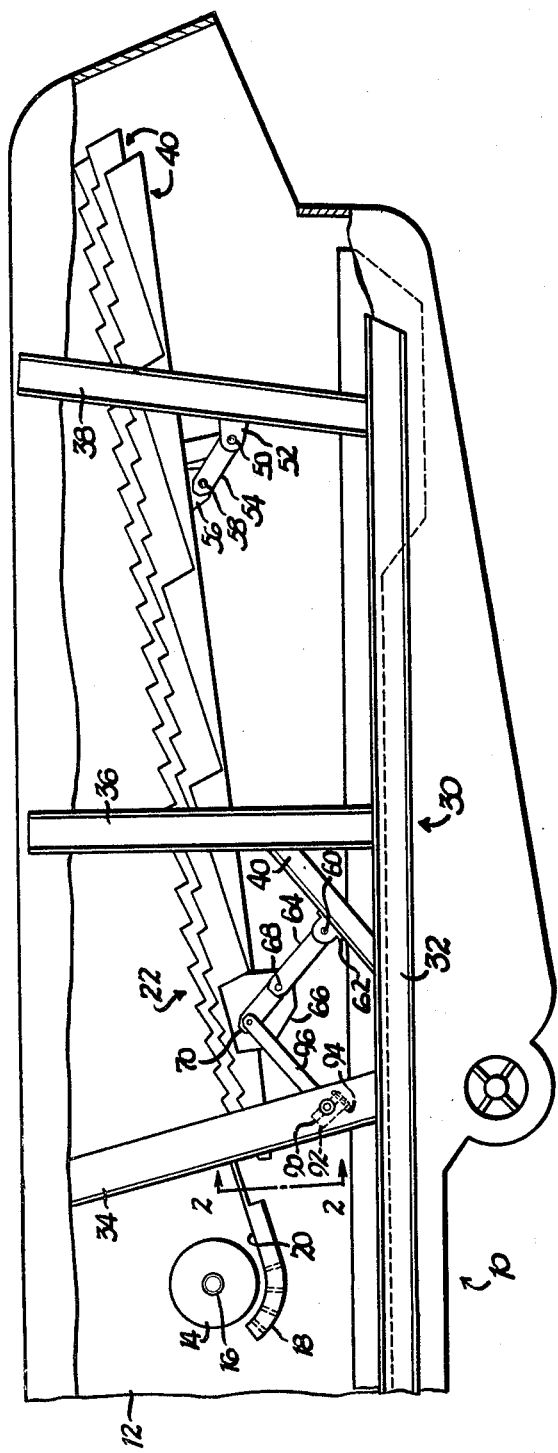
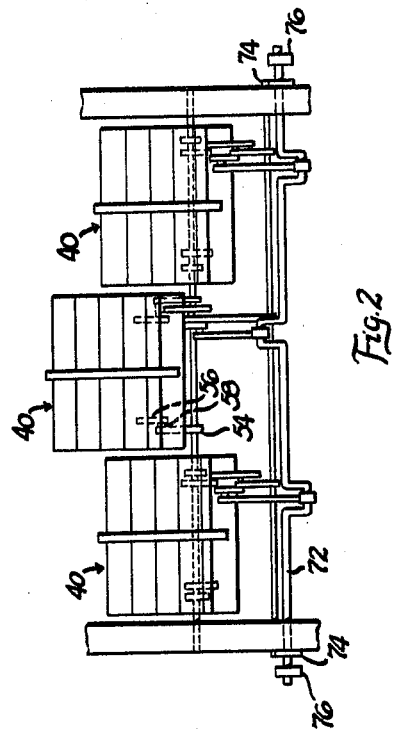
INVENTORS
Martin A. Davidow
Maurice Klee
WILSON, SETTLE, BATCHELDER
ATT'YS. & CRAIG.

Nov. 18, 1969   M. A. DAVIDOW ET AL   3,478,749
GRAIN SEPARATING MECHANISM FOR THRESHING MACHINES
Filed Dec. 28, 1966   2 Sheets-Sheet 2

INVENTORS
Martin A. Davidow
Maurice Klee

WILSON, SETTLE, BATCHELDER
ATT'YS.   & CRAIG.

United States Patent Office 3,478,749
Patented Nov. 18, 1969

3,478,749
GRAIN SEPARATING MECHANISM FOR
THRESHING MACHINES
Martin A. Davidow, Bettendorf, and Maurice Klee,
Davenport, Iowa, assignors to J. I. Case Company,
Racine, Wis., a corporation of Wisconsin
Filed Dec. 28, 1966, Ser. No. 605,293
Int. Cl. A01f 12/38
U.S. Cl. 130—26                                   1 Claim

ABSTRACT OF THE DISCLOSURE

The present disclosure relates to a grain separator for a threshing machine and in which a plurality of walker sections are pivotally connected to a frame to allow for generally forward and rearward arcuate movement with respect to the frame with driving means for moving one of the walker sections in a forward direction while simultaneously moving the adjacent walker section in a rearward direction.

---

The present invention relates to harvesting machines and more particularly to improved separators for separating the grain from the harvested crop in the harvesting machines.

In modern harvesting machinery, such as combines, it is customary to pass the harvested material through a threshing mechanism, such as a cylinder and a concave, wherein most of the grain is removed from the harvested material and thereafter deposit the harvested material, having some grain remaining therein, upon a crop separator to separate the remaining grain from the harvested material.

One type of known crop separator is a one piece rack which is vibrated by oscillating the rack in a generally fore and aft direction to thereby separate the grain from the harvested material. A second type of crop separator is commonly referred to as a straw walker in which a plurality of adjacently disposed walker sections are driven with an oscillating movement to agitate and move the harvested material rearwardly causing the grain to sift through the remainder of the harvested material and fall through suitable openings provided in the walker sections. Upward and downward movement is imparted to the walker sections at the same time as a fore and aft movement is imparted thereto and the adjacent walker sections are operated out of phase so that when one walker section is moving downwardly and rearwardly the adjacent walker section is moving upwardly and forwardly. The above-mentioned motions are imparted at a high rate thereby tossing the harvested material and separating the material, which may be matted, to allow the grains to fall through the material and pass through openings provided in the walker sections.

It has been customary to generally use straw racks in threshing operations wherein the layer of harvested material is relatively thin and fairly loose. Straw walkers are generally used in threshing machines for harvesting materials in which a heavy or matted layer of material is required to be separated to some degree to allow the grain remaining therein to pass from the harvested material into and through the openings in the walkers sections.

The primary object of the present invention is to provide an improved crop separator which has the combined advantages of the straw rack and the straw walker.

Another object is to provide improved crop separating apparatus which is capable of agitating as well as forcing the harvested material above the crop separator while it is being moved rearwardly thereon.

Other objects and advantages will become apparent on reading the following specification in conjunction with the accompanying drawings, wherein;

FIGURE 1 is a fragmentary side elevational view of a self-propelled threshing machine, with parts broken away, having the features of the present incorporated therein;

FIGURE 2 is a vertical sectional view taken generally along lines 2—2 of FIGURE 1;

Figure 3:
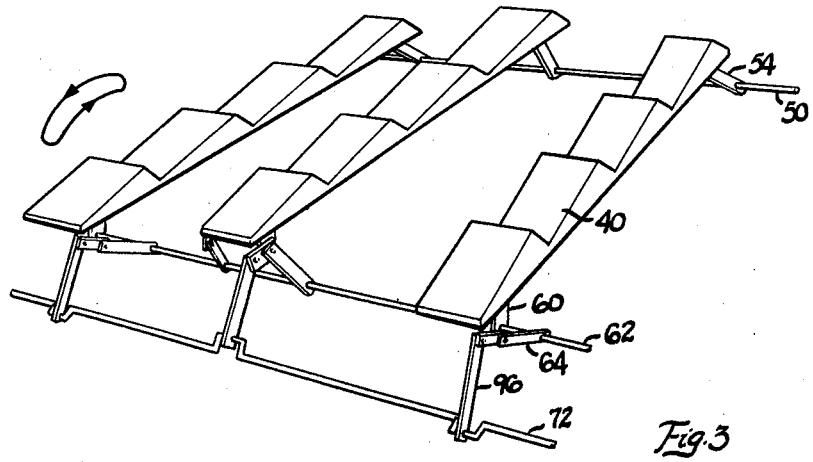
FIGURE 3 is a schematic view of the crop separating mechanism of the invention showing the relative movement of the various sections.

In accordance with the present invention, the crop separating mechanism comprises a plurality of walker sections disposed in side-by-side relation with respect to each other and mounted within a frame. Each of the walker sections is pivotally mounted upon the frame through rocker arms attached to spaced members rotatable on a frame, to allow the walker sections to oscillate in a generally fore and aft direction. Eccentric means are provided for driving the adjacent walker sections out of phase so that while one walker section is being moved downwardly and forwardly the adjacent walker section is being moved upwardly and rearwardly.

FIGURE 1 of the drawings shows a threshing machine having the features of the present invention incorporated therein. The threshing mechanism or machine 10 includes a housing 12 which has a cylinder 14 of any well known type journaled in suitable bearings 16 carried by the housing. The cylinder is rotated in a well known manner, not necessary to be shown and described since it forms no part of the present invention. A concave 18 is adjustably supported in close proximity to the cylinder 14 and has a plurality of bars or fingers 20 forming a grate directed to a region above the crop separator, generally designated by the reference 22. The material falling unto the crop separtor 22 is agitated and tossed thereon, while being shifted in a generally rearward direction from the cylinder until finally being discharged at the rear of the machine over the end of the separator. The grain, which is separated from the remaining material is received on a grain pan and cleaning shoe, generally designated at 24. Since the element 24 forms no part of the invention, a detailed description is not necessary.

It is, of course, desirable to have all of the grain removed from the material received on the crop separator before harvested material passes from the rear edge of the separator, since any grain remaining therein is lost. According to the invention, this is accomplished by providing an improved crop separator utilizing a plurality of walker sections which are driven in a unique manner, to increase the percentage of grain recovered from the large mass of material which is received on the walker sections.

In the illustrated embodiment of the invention, the crop separator 22 is supported upon transversely spaced frames 30 each having a generally horizontally disposed beam 32, a plurality of generally vertically disposed beams 34, 36 and 38 and an angular disposed beam 40. The frames 30 are supported by the housing 12 in a manner well known in the art.

The crop separator of the present invention comprises a plurality of conventional walker sections 40, three being shown for purposes of illustration, which are mounted for generally fore and aft movement with respect to the frame 30. For this purpose, a rotatable member or rod 50 extends generally transversely of the walker sections 40 and has its opposite ends journaled in bearings 52 supported upon the transversely spaced beams 38.

A rocker arm 54 has one end fixedly secured to the member or shaft 50 and the opposite end pivotally connected to a walker section 40. The pivotal connection is illustratively shown as being provided through a bracket 56 carried on the lower portion of the walker section with a pin 58 pivotally interconnecting the free end of each rocker arm 54 to the associated bracket 56.

The forward end of the walker sections are similarly mounted for generally fore and aft movement. A second member or shaft 60 extends between the spaced frames 30 and has its opposite ends rotatably journalled in bearings 62 supported on a surface of the beams 40. The rotatable shaft 60 is provided with rocker arm 64 for each of the walker sections with one end of each of the rocker arms fixedly secured to the shaft 60 and the opposite end is pivotally connected to a bracket 66, secured to each of the walker sections 40, through a pivot pin 68. The rocker arms include an extension 70, for a purpose to be described.

According to the invention, drive means are provided for moving the walker sections in a generally forward and rearward direction to cause the crop to move generally rearwardly upon the walker sections and simultaneously provide a generally upwardly and downward movement of the walker sections. For this purpose, the driving means (FIG. 3) includes a multiple throw crank shaft 72 which is supported for rotation on the space vertically extending beams 34 of the frame 30. The beams 34 are provided with bearings 74 which receive the opposite ends of the multiple throw crank shaft 72. One end of the mulitple throw crank shaft is provided with an extension extending beyond the beam 34 which receives a drive sprocket or pulley 76. It is to be understood that the drive sprocket or pulley 76 is driven from the power source (not shown) of the self-propelled vehicle through any suitable interconnection (not shown) to continuously rotate the crank shaft 72 about a common axis formed by the bearings 74. As shown in FIGURE 2, the crank shaft has three crank journals 80, 82 and 84 which are equally spaced on the shaft 72 and one of the crank journals is in generally transverse alignment with the extension 70 of the one of the rocker arms 64 of each of the walker sections 40.

Each of the crank journals is provided with bearing means in the form of split bearing sections 90 and 92 which are secured to the respective journals by bolts 94. The split bearing section 90 of back bearing is provided with a bar 96 fixedly secured thereto which has it opposite end pivotally connected to the aligned extension 70 provided on the rocker arms 64.

The amount of movement of the walker sections may be adjusted by raising or lowering the bearings 52 and 62 and consequently the shafts 50 and 60 to alter the inclination of the rocker arms. This change in inclination will result in a change of aggressiveness of the walker section motion for different crop conditions.

In operation, the multiple throw crank shaft 72 is continuously rotated to cause a generally arcuate movement of the free end of the extension 70 on each of the rocker arms connected to the respective crank journals. At this same time the respective walker sections are moved in the generally forward and rearward direction longitudinally of the housing 12 and the frame 30 by being moved between two positions as the rocker arms 54 and 64 are pivoted about shafts 50 and 60. This will provide the arcuate motion of each of the walker sections (schematically shown in FIGURE 3) as they are being driven by the common power source. However, since adjacent sections are being driven out of phase in rapid motion, there will be a combined lifting and tearing action on the harvested material moved thereon.

Figure 4:
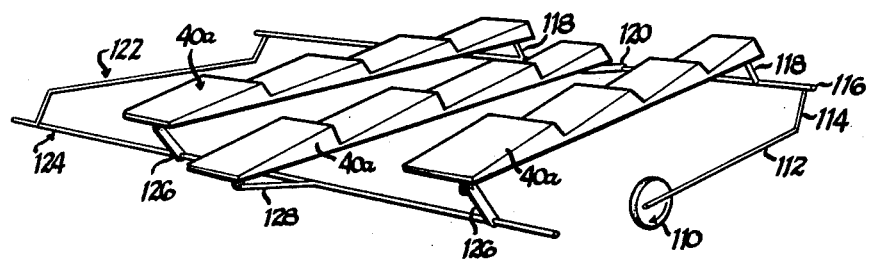
FIGURE 4 is a perspective view of a slightly modified form of driving mechanism for the crop separator.
Figure 5:
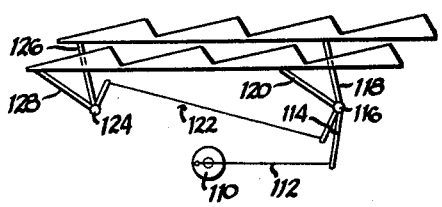
FIGURE 5 is a side elevational view of the mechanism shown in FIGURE 4.

A modified form of drive means for the walker sections is shown in FIGURES 4 and 5. The modified driving means includes a cam 110 rotated by power means (not shown) and interconnected through rod 112 to a crank arm 114 fixed to a rotatable shaft 116. The opposite ends of the shaft 116 are suitably journalled in the frame of the housing (not shown). The shaft 116 has one end of a pair of arms 118 secured thereto with the opposite ends respectively secured to alternate spaced walker sections 40a. The intermediate walker section 40a is mounted for pivotal movement with respect to the shaft 116 through a linkage connection 120.

The shaft 116 further includes linkage means 122 for oscillatng or rotating a second shaft 124 in response to movement of the first shaft 116. The second shaft 124 has a pair of arms 126 having one end pivotally secured to the shaft and the opposite ends pivotally secured to one end of the respective spaced walker sections 40a. The free end of the intermediate walker section 40a is adapted to be driven by the shaft 124 through an arm 128 secured to the shaft and pivoted on the walker section.

Thus, rotation of the cam 110 will rotate the shaft 116 between two extreme positions and the interconnecting arms 118 will drive the alternate spaced walker sections 40a through an arcuate path. The linkage connection 122 between the shafts 116 and 124 will drive the second shaft 180° out of phase with the first shaft and will thereby move the intermediate walker section 40a 180° out of phase of the two alternate walker sections driven by the shaft 116. This arrangement will provide a dynamic balance for the movement of the respective walker sections and at the same time will provide a unique movement of the respective adjacent walker sections to produce an efficient shredding of the material being passed along the crop separator formed by the walker sections 40a.

Although two types of driving means have been illustrated, it is readily apparent and considered to be within the spirit of the invention that the same motion may be provided with eccentrics or cams mounted upon a single shaft. By way of example, the driving means may be in the form of a continuous cam extending transversely of the walker sections and disposed centrally between the forward and rearward pivoted shafts 50 and 60 (FIGS. 1-3). The interconnection between the respective walker sections and the cam shaft would then be alternatively connected to the forward and rearward rocker arms on the respective walker sections. Therefore, while the first walker section would be moving in a generally forward direction the adjacent or second walker would be moved in a generally rearward direction with the movement of the walker sections being 180° out of phase.

It can readily be appreciated that crop separators constructed in accordance with the invention will combine the unique advantageous features of both the straw walker and the straw rack in a single unitary structure. This will allow a single crop separator to be utilized for any type of crop. This of course will provide greater versatility for any threshing machine so as to be capable of harvesting various types of crops without any changes in the structure of the crop separator.

It should be understood that the embodiment of the invention shown and described has been for purposes of illustration only and the scope of the invention is limited only by the following claim.

We claim:

1. A crop separator for a harvesting machine comprising a frame, a straw and grain separating structure including a plurality of walker sections arranged longitudinally within said frame in side-by-side relation, a pair of transversely extending shafts located at opposite ends of said walker sections, links pivotally connected to each end of each walker section and carried by the respective shafts with alternate links of one shaft fixedly secured to said one shaft for rotation therewith and alternate links of the other shaft fixedly secured thereto whereby alternate walker sections are driven by one shaft and the remaining walker sections are driven by the other shaft, a single driven shaft extending transversely of said harvesting machine and having an eccentric connected thereto, a first link on one of said shafts, a second link connecting said eccentric to said first link, and linkage means drivingly connecting said one of said shafts out of phase with respect to the other of said shafts so that rotation of said driven shaft causes oscillation of said one of said shafts and simultaneous oscillation of the other of said shafts out of phase with said one of said shafts whereby to move some of said walker sections in one direction while simultaneously moving the remaining walker section in an opposite direction.

References Cited

UNITED STATES PATENTS

| 757,904 | 4/1904 | Fredeen | 130—26 |
| 762,639 | 6/1904 | Kramer | 130—26 |
| 1,202,762 | 10/1916 | Kranich | 130—26 |

ANTONIO F. GUIDA, Primary Examiner